United States Patent Office.

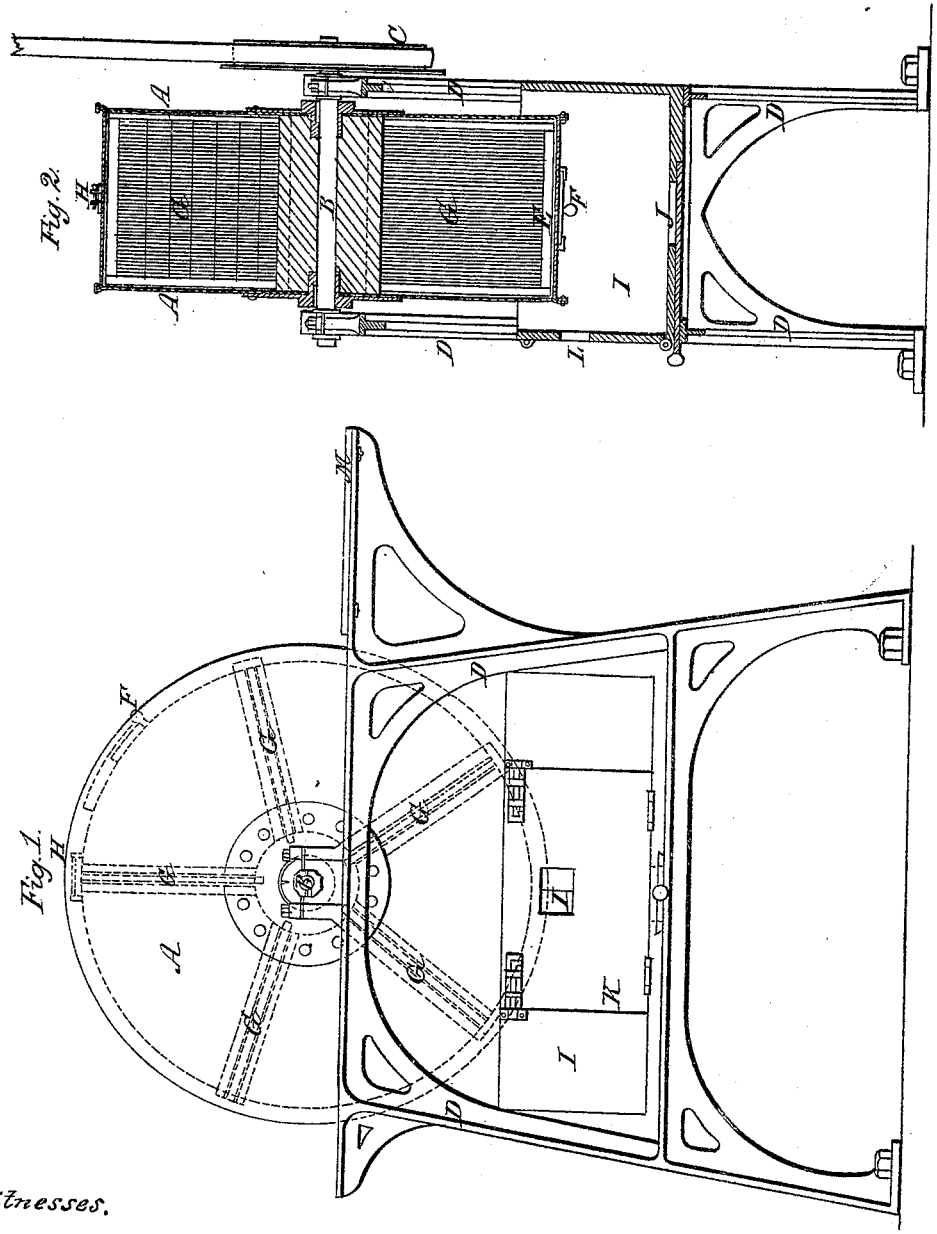

WILLIAM THOMPSON, OF NO. 85 LOWER GARDINER STREET, DUBLIN, IRELAND.

Letters Patent No. 88,823, dated April 13, 1869.

IMPROVEMENT IN MACHINE FOR MIXING TEA.

The Schedule referred to in these Letters Patent and making part of the same.

*To all whom it may concern:*

Be it known that I, WILLIAM THOMPSON, of No. 85 Lower Gardiner street, in the city and county of Dublin, Ireland, have invented "An Improved Machine, or Apparatus for Mixing Teas, and other Granular Substances;" and I do hereby declare that the following is a full and exact description of the said invention, reference being had to the accompanying drawing, and to the figures and letters marked thereon; that is to say—

My invention consists in constructing a machine, or apparatus for mixing teas, and other granular substances, wherein a series of sieves, or gratings is caused to travel upward, one upon the other, in an enclosed casing, so that the tea, or other substance placed upon the sieves, in being raised up thereby, falls through the meshes of the one grating, or sieve, on to the next one below, and so on in succession, whereby the tea, or other substance, will be effectually mixed.

The arrangement of the machine, or apparatus for carrying my invention into practice is capable of being variously modified.

Figures 1 and 2, on the accompanying drawing, show respectively a front elevation and a transverse section of one arrangement.

A is a closed cylinder, or drum, having a central shaft, B, provided at one end, with a pulley, C, or other suitable gearing, for imparting rotary motion thereto, and running in bearings formed on the frame-work D.

The drum A is provided with an aperture, E, in its circumference, capable of being closed by means of a sliding cover, F, and contains a number of sieves, or gratings, G G, arranged in radial positions, as shown in dotted lines in fig. 1.

The sieves are, by preference, arranged to slide in grooves formed in the sides of the casing, being introduced through slits in the circumference thereof, which they close, so as to prevent the escape of tea therefrom, and they are held in their places by means of a bolt, or catch, H.

By this arrangement, the sieves can be readily removed for cleansing, or repairs, or for introducing other sieves, or gratings of a greater or less degree of fineness.

The lower part of the drum works inside a box, or receptacle, I, into which the tea is allowed to fall when perfectly mixed, and from which it is filled into the tea-chests through an aperture, J, closed by a sliding cover.

The receptacle I, is also provided with a door, K, for clearing it out, in which door an opening, L, is formed, through which access is gained to the sliding cover of the drum.

For commencing operations with this apparatus, the drum A is turned till the aperture E is in the position shown at fig. 1, when an attendant, situated on the platform M formed on the framing, when the apparatus is of large dimensions, introduces the tea to be mixed into the drum. The aperture E is then closed, and the drum is caused to revolve slowly, whereby the tea, in falling through the meshes, or spaces of one sieve on to the next below, as it is raised by these in passing upward, becomes thoroughly mixed in a comparatively short space of time.

When this has been effected, the drum is turned, so that the aperture E is inside the receptacle I, and the tea is allowed to pass into the latter, whence it is then filled into the chests.

Figure 3 shows a vertical section of another modification of my improved apparatus for mixing teas, and other granular substances.

Inside the closed casing A is an endless band, B, of leather, or other suitable material, stretched over two polygonal rollers, C, the edges of which band fit closely against the flat sides of the casing.

To this band is fixed a number of sieves, or gratings, G, held in a horizontal position, or at right angles to the band, by means of stays, or gusset-pieces, E E, the edges of which sieves fit as closely as practicable against the surfaces of the casing.

A hopper, F, is fixed, or formed on the top of the casing, through which the teas requiring to be mixed are introduced, and an aperture, D, closed by a slide, H, is provided at the bottom, through which the tea passes after having been mixed.

It will be seen, that if rotary motion is imparted to the lower roller, C, by means of a crank-handle, I, or by other means, the series of sieves, or gratings G will travel up on one side of the casing and down on the other, and the tea, being lifted up thereby, gradually falls through the gratings as they ascend, as in the previous arrangement, and thus becomes effectually mixed.

Having now described the nature of my invention, and in what manner the same is to be performed, I wish it to be understood that what I claim, is—

Constructing apparatus for mixing teas, and other granular substances, in which a series of sieves, or gratings, G, is caused to travel upward, one above the other, inside a casing, A, so that the tea, in being raised up thereby, falls through the meshes, or spaces of the one sieve, or grating, on to the next one below, and so on in succession, substantially as and for the purposes hereinbefore set forth.

In testimony whereof, I have signed my name to this specification in the presence of two subscribing witnesses, this 9th day of November, 1868.

WILLIAM THOMPSON,
85 *Lower Gardiner Street, Dublin, Ireland.*

Witnesses:
JOHN MORRIS,
51 *Eccles Street, Dublin.*
WM. CAHILL,
6 *Kincaid Terrace,*
*Aughrim Street, Dublin.*